United States Patent [19]

Loizeau et al.

[11] Patent Number: 4,537,580
[45] Date of Patent: Aug. 27, 1985

[54] TORSIONAL DAMPER DEVICE

[75] Inventors: Pierre Loizeau, Ville D'Avray; André Caray, Valence, both of

[73] Assignee: Valeo, Paris, France

[21] Appl. No.: 529,741

[22] Filed: Sep. 6, 1983

[30] Foreign Application Priority Data

Sep. 7, 1982 [FR] France .................. 82 15175

[51] Int. Cl.³ .................. F16D 3/14; F16D 13/68
[52] U.S. Cl. .................. 464/68; 192/106.2; 464/64; 464/66; 464/85
[58] Field of Search .................. 464/62–68, 464/81, 82, 85, 903; 192/106.1, 106.2

[56] References Cited

U.S. PATENT DOCUMENTS

| | | | |
|---|---|---|---|
| 2,533,789 | 12/1950 | Goodchild | 464/85 |
| 3,556,273 | 1/1971 | Maucher | 192/106.2 |
| 3,695,405 | 10/1972 | Maucher et al. | 464/68 X |
| 4,446,955 | 5/1984 | Lech, Jr. | 192/106.2 |
| 4,461,376 | 7/1984 | Lech, Jr. et al. | 464/68 X |
| 4,496,036 | 1/1985 | Loizeau | 464/68 X |

FOREIGN PATENT DOCUMENTS

| | | |
|---|---|---|
| 2848486 | 5/1979 | Fed. Rep. of Germany ........ 464/68 |
| 740783 | 2/1933 | France . |
| 2149646 | 3/1973 | France . |
| 2493446 | 1/1983 | France . |
| 392279 | 9/1965 | Switzerland . |

Primary Examiner—John Petrakes
Attorney, Agent, or Firm—Charles A. Brown; Charles E. Brown

[57] ABSTRACT

A torsional damper device comprises two parts disposed to rotate relative to one another within defined limits of relative angualr movement. Such relative angular movement is resisted by elastic members each of which is disposed in a housing formed by holes in said parts. At least one bears in the circumferential direction and through the intermediary of a chock on the edge of the corresponding hole in one part. Opposite the other part, the chock has a recess such that on relative angular movement between the parts, this other part may become displaced in the circumferential direction beyond the point of contact of the chock on the corresponding edge of the hole in the first mentioned part.

23 Claims, 31 Drawing Figures

TORSIONAL DAMPER DEVICE

BACKGROUND OF THE INVENTION

1. Field of the Invention

The present invention is generally concerned with torsional damper devices comprising two coaxial parts disposed to rotate relative to one another within defined limits of relative angular movement against elastic means hereinafter referred to as circumferentially acting elastic means.

2. Description of the Prior Art

This type of torsional damper is normally incorporated in the design of a friction clutch, particularly for automotive vehicles, in which case one coaxial part carries a friction disk designed to rotate with a first shaft, in practice a driving shaft and the motor output shaft in the case of an automotive vehicle, whereas the other of said coaxial parts is carried on a hub designed to rotate with a second shaft, in practice a driven shaft, and the gearbox input shaft in the case of an automotive vehicle.

This type of torsional damper is used to permit regulated transmission of rotational torque applied to one of its coaxial parts where the other is itself subject to a rotational torque. It is thereby able to filter vibrations which may arise at any point in the kinematic system in which it is incorporated, extending from the motor to the driven road wheels in the case of an automotive vehicle.

The present invention is particularly directed towards the case where one of the two coaxial parts concerned comprises a transversely disposed annular flange and the other comprises at least one transversely disposed guide ring, the associated circumferentially acting elastic means comprising individual elastic members each of which is disposed in a housing formed partly by a hole formed for this purpose in said flange and partly by a hole also formed for this purpose in said guide ring.

More often than not, two guide rings are provided, one on each side of the flange and fastened together.

More often than not, the elastic means bear directly in the circumferential direction on the corresponding radial edge of the holes in the guide rings in which they are disposed, these holes also having more or less extensive members along at least one of their circumferential edges adapted to retain elastic members of this kind.

It has already been proposed, in particular in French Pat. No. 740 783, to dispose in the circumferential direction between each of the elastic members and the edge of the hole in the guide ring in which the elastic member is disposed a chock adapted to retain the elastic member when the holes in the guide rings have no such member.

Be this as it may, a general problem to be overcome in producing torsional damper devices of this type is to ensure optimum standardization of their component parts, whatever their specific application conditions, in order to minimize their cost.

From this point of view, it is of benefit to have guide rings adapted to suit various applications in spite of having the same holes for housing elastic members.

For example, in the case of fitting out an automotive vehicle offered to customers in two versions, a standard version and a version with a turbocharger, it is necessary for the torsional damper device used in the second case to have a higher torque rating.

Starting with a torsional damper device which, for the standard version, comprises elastic members constituting the circumferentially acting elastic means and all disposed in holes in the flange and the guide rings and divided into a number of separate groups of elastic members of different stiffness, consideration might be given to replacing the least stiff of these elastic members with elastically deformable arms superposed axially on the coaxial parts concerned and acting circumferentially between them, as described in French Patent Application No. 80 23447 of Nov. 3, 1980 published under the No. 24 93446. For the version with turbocharger, elastic members of higher stiffness would be disposed in the holes thus made available, and adapted to function during the final phase of relative angular movement between said coaxial parts.

However, it is then necessary, and this conflicts with the requirement for standardization, either to decrease the circumferential amplitude of the corresponding holes in the guide rings or to increase that of the corresponding holes in the flange.

Similarly, in the case where at least some of the elastic members utilized are coil springs, it could be beneficial, beginning with guide rings having a given disposition of holes, to be able to reduce artifically the circumferential amplitude of certain at least of these holes so as to accommodate springs shorter than those for which the holes were initially designed, whilst retaining the possibility for less stiff elastic members to function before the latter.

A general object of the present invention is to provide an arrangement with which this objective can be achieved, whilst satisfying the requirement for standardization.

SUMMARY OF THE INVENTION

The present invention consists in a torsional damper device comprising at least two coaxial parts disposed to rotate relative to one another within defined limits of relative angular movement, a transversely disposed flange on one of said parts, a transversely disposed guide ring on the other of said parts, circumferentially acting elastic means disposed between said parts, adapted to act circumferentially on said parts so as to resist said relative angular movement and comprising individual elastic members, holes in said flange, holes in said guide ring, said holes in said flange and said guide ring together forming housings in which respective elastic members are disposed, a chock through which at least one of said elastic members bears on the edge of the respective hole in said guide ring, and a recess in said chock disposed in line with said flange so that on relative angular movement between said parts said flange may become displaced in the circumferential direction beyond the point of contact of said chock with the associated edge of the corresponding hole in said guide ring.

In the case where there are two guide rings, attached together and one on each side of and spaced from the flange, the chock utilized in accordance with the invention may, for example, in a first embodiment of the invention, extend integrally from one guide ring to the other, said chock then being generally stirrup-shaped and bearing on the edge of the corresponding holes in the guide rings through its lateral arms and offering a bearing surface to an elastic member through its median part.

For an application of this kind, which is especially suited to the case where it is necessary to increase the torque rating of a torsional damper device, the hole provided in accordance with the invention in the chock utilized is formed by the concavity of the stirrup member constituting this chock.

Alternatively, in a second embodiment of the invention, the chock utilized is divided into two separate chock members carried by respective guide rings and axially offset from one another.

In this second embodiment, which is especially suited to the case where the circumferential amplitude of at least some of the holes in the guide rings must be reduced, the opening in the chock in accordance with the invention is formed by the axial gap between the two chock members which constitute it.

Be this as it may, by virtue of the recess which it comprises, and which is neither disclosed nor even suggested in the aforementioned French Pat. No. 740 783, the chock utilized in accordance with the invention offers the advantage of making adaptable to specific application conditions pre-existing guide rings, favoring the economic standardization of these guide rings, for torsional damper devices with differing characteristics.

Further objects and advantages will appear from the following description of examples of the invention, when considered in connection with the accompanying drawings, and the novel features will be particularly pointed out in the appended claims.

DESCRIPTION OF THE PREFERRED EMBODIMENTS

As shown in these figures, which illustrate, by way of example, the application of the invention to the construction of a friction clutch with damper-type hub for automotive vehicles, the torsional damper device in accordance with the invention generally comprises two coaxial parts A and B disposed to rotate relative to one another, as will be described in detail hereinafter, within defined limits of relative angular movement, against the action of elastic means adapted to act circumferentially between them, hereinafter referred to for convenience as circumferentially acting elastic means.

In the embodiment illustrated by FIGS. 1 to 9, the coaxial part A comprises an internally splined hub 10 designed to be keyed to, so as to rotate with, a shaft, in practice a driven shaft, the gearbox input shaft in the case of an automotive vehicle, and a transversely disposed annular hub flange 11 which is keyed to rotate with hub 10 and which, for example and as shown, is attached to the latter by crimping.

Conjointly, the coaxial part B comprises at least one transversely disposed guide ring 12. In the embodiment shown in FIGS. 1 to 9, it comprises two guide rings 12 attached to one another by axial spacers 13 which pass with clearance through notches 14 formed for this purpose in the edge of hub flange 11, the guide rings being disposed one on each side of and spaced from said hub flange 11.

Since the assembly constitutes a friction clutch for an automotive vehicle, the coaxial part B further comprises a friction disk 16 with a flange 17 coupled to one of guide rings 12, on the side thereof towards hub flange 11, and which, by virtue of friction facings 18 attached to each side of the perimeter of flange 17, is designed to be clamped between two plates which can be keyed to, so as to rotate with, a shaft, in practice a driving shaft, the motor output shaft in the case of an automotive vehicle.

In practice, in the embodiment represented, flange 17 of friction disk 16 is attached to guide ring 12 to which it is coupled by pegs 13 which also attach to the latter the other guide ring 12, the flange being of unitary construction. As an alternative, flange 17 may be subdivided into vanes.

In the following description, it will be considered as equivalent to guide ring 12 to which it is coupled.

Figures 2, 8, 10, 11, 12, 13, 14, 15:
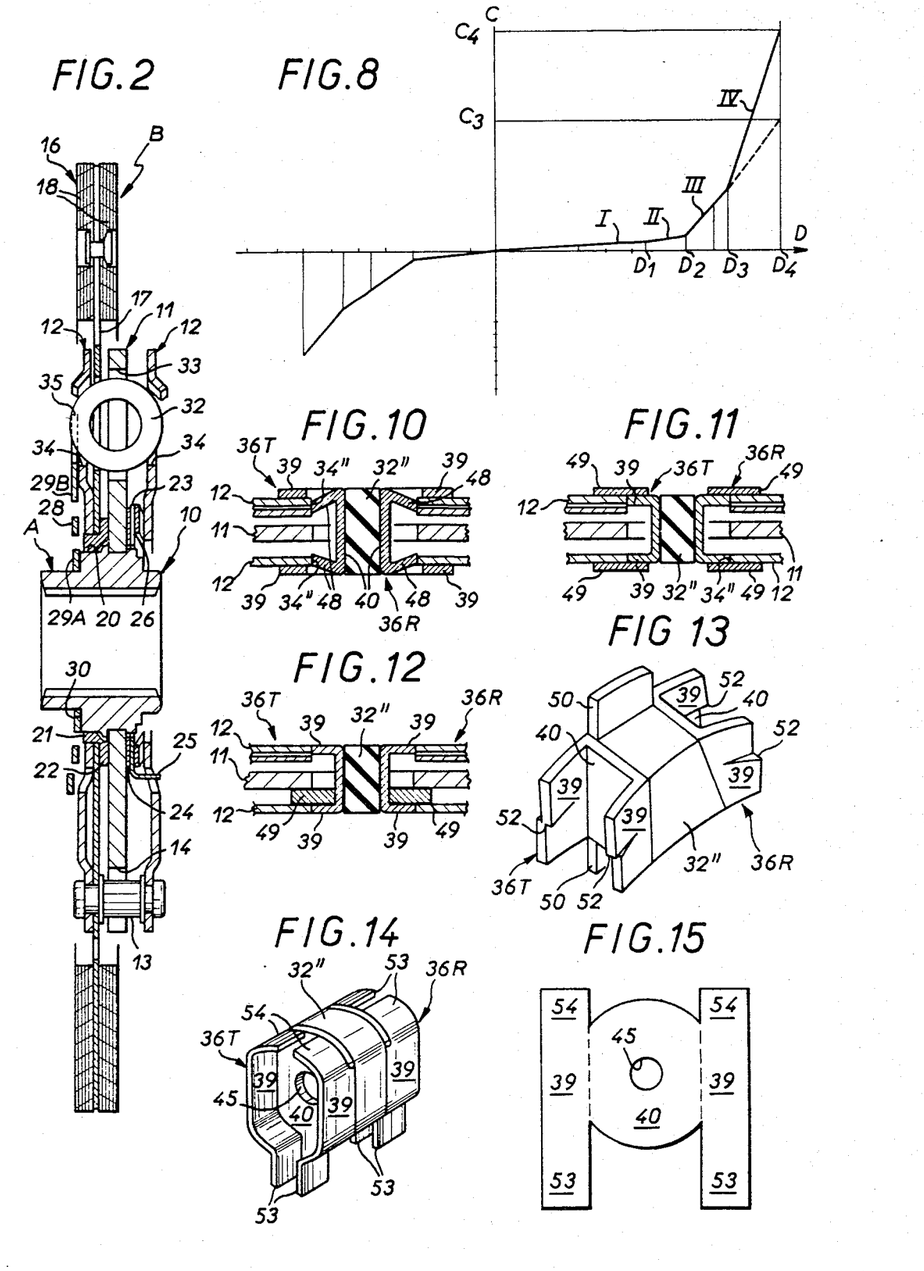
FIG. 2 is an axial cross-section through it on the line II—II in FIG. 1.
FIG. 8 is a diagram illustrating the operation of the torsional damper device in accordance with the invention.
FIGS. 10 to 12 are views analogous to that of FIG. 3 relating to respective alternative embodiments.
FIG. 13 is a perspective view relating to a still further embodiment of the chock utilized in the torsional damper device in accordance with the invention.
FIG. 14 is a view analogous to that of FIG. 13, for a yet further embodiment.
FIG. 15 is a plan view showing the method of manufacturing one of the chocks shown in FIG. 14.
Figure 5:
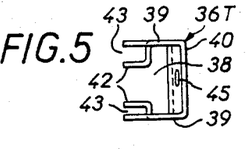
FIG. 5 is a plan view of this chock, seen in the direction of the arrow V in FIG. 4.
Figure 7:
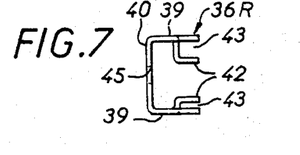
Figure 9:
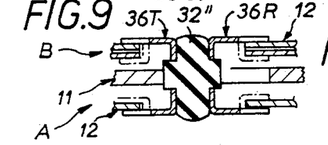
FIG. 9 is a view analogous to that of FIG. 3, corresponding to the final phase of this operation.

Between that of guide rings 12 to which is coupled friction disk 16 and its flange 17 and a bearing surface 20 of hub 10 there extends annularly a bearing 21 to which is attached a radial flange 22 inserted axially between said flange 17 of friction disk 16 and hub flange 11 (FIG. 2).

On the other side of hub flange 11, between the latter and the corresponding guide ring 12, there further extends a support ring 23 which carries, in contact with hub flange 11, a friction facing 24. Keyed to said guide ring 12 so as to rotate therewith by axial lugs 25, it is acted on by an axially acting elastic ring 26, for example of the kind available under the trade name "ONDUL-FLEX", bearing on said guide ring 12.

These arrangements are well known per se and as they do not form part of the present invention will not be described in detail here.

In a manner also known per se, the circumferentially acting elastic means disposed between coaxial parts A and B are divided, in the embodiments shown in the figures, to form two damper stages of differing stiffness, a first damper stage of relatively low stiffness, which acts alone at the start of relative angular movement between said coaxial parts A and B, and a second damper stage of relatively higher stiffness which acts in conjunction with the first from a particular value of such relative angular movement.

In the embodiment shown in FIGS. 1 to 9, and as described in detail in the aforementioned French Patent Application No. 80 23447, the first damper stage comprises one or more elastically deformable arms 28 circumferentially established between, on the one hand, a support member 29A which rotates with coaxial part A, being to this end, for example, attached to hub 10 against a transverse shoulder 30 thereof, and, on the other hand, a support member 29B which rotates with coaxial part B, by virtue of arrangements to be described in more detail hereinafter (FIG. 2).

The second damper stage provided between coaxial parts A and B comprises elastic members each of which is disposed in a housing formed partly by a hole formed for this purpose in hub flange 11 and partly by holes formed for this purpose in guide rings 12.

In the embodiment represented on FIGS. 1 to 9, and in a manner known per se, these elastic members are themselves divided into a number of separate groups, intervention of which during relative angular movement between coaxial parts A and B is modulated as a function of the degree of such movement.

There is firstly a first group of elastic members formed by two coil springs 32 in substantially diametrically opposite positions relative to one another and extending substantially tangentially relative to a circumference of the assembly. Each is disposed in a housing formed partly by a hole 33 in hub flange 11 and partly in holes 34 in guide rings 12, the circumferential amplitude of said hole 33 in hub flange 11 being greater than that of said holes 34 in guide rings 12.

It is in practice through the intermediary of these springs 32, which are the first to act in the second damper stage, that support member 29B for the elastically deformable arm(s) 28 of the first damper stage is constrained to rotate with coaxial part B, said support member 29B having projecting radially from its periphery at least one pair of arms 35 by virtue of which it is engaged over at least one of springs 32 (FIG. 2). In the embodiment shown, arms 35 of this kind are thus engaged without clearance over the corresponding spring 32 but it will be understood that the various alternative embodiments, with and without clearance and/or with one or two arms or fingers, as described in the aforementioned French Patent Application No. 80 23447, are equally applicable in this case.

In the embodiment shown in FIGS. 1 to 9, the second group of elastic members of the second damper stage similarly comprises two springs 32', each disposed in a housing formed partly by a hole in hub flange 11 (not visible in the figures) and partly by holes 34' in guide rings 12, the circumferential amplitude of said hole in hub flange 11 being greater than that of said holes 34' in guide rings 12 by a clearance value which is greater in both circumferential directions than the corresponding clearance existing between springs 32 and hole 33 in hub flange 11 and holes 34 in guide rings 12.

In the embodiment shown in FIGS. 1 to 9, the second group of elastic members of the second damper stage further comprises two blocks 32" of elastic material, such as an elastomer, for example, like springs 32 and 32' disposed, alternately with said springs, in respective housings formed partly by a hole 33" in hub flange 11 and partly by holes 34" in guide rings 12.

Figures 1, 3, 4, 6:
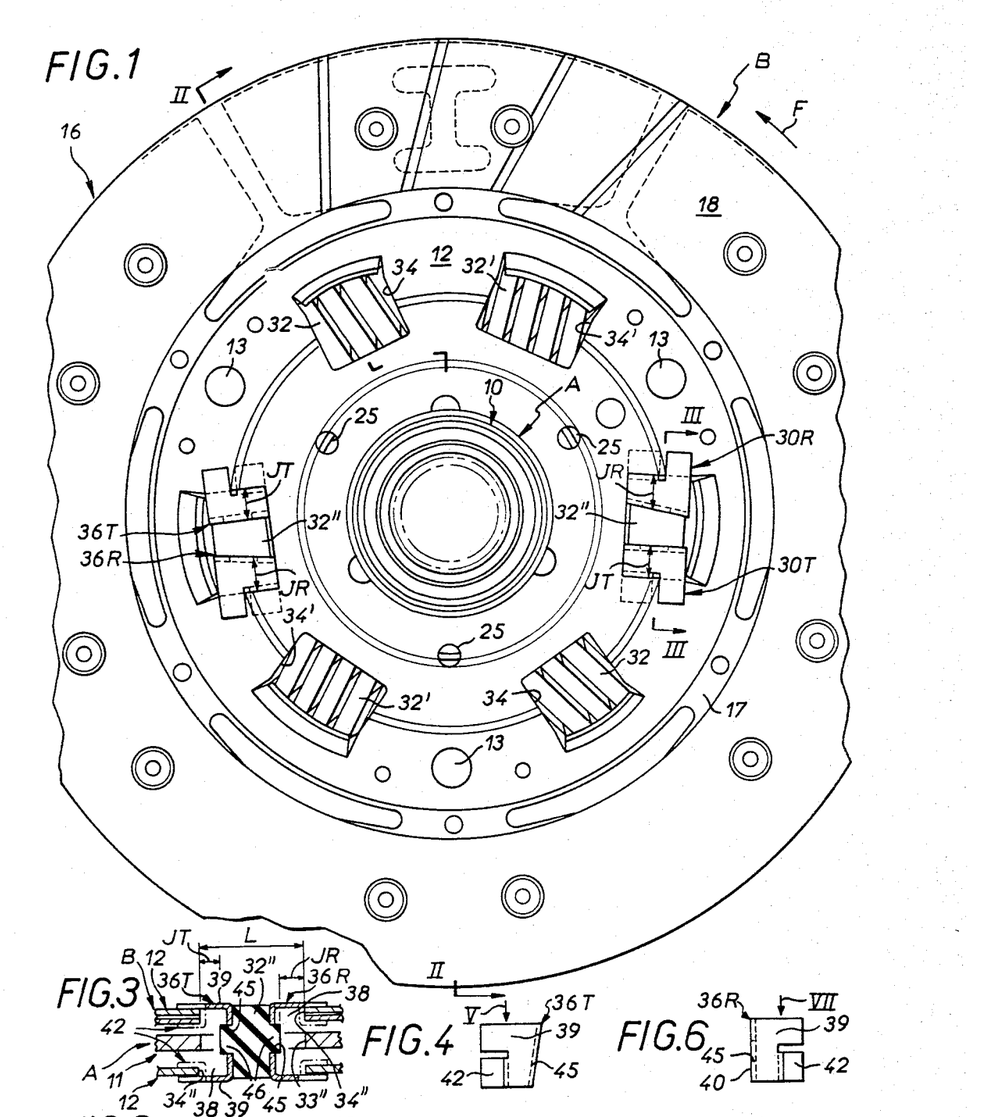
FIG. 1 is a partial view in elevation of a torsional damper device in accordance with the invention.
FIG. 3 is a partial circumferential cross-section through it on the line III—III in FIG. 1, in the rest configuration of the assembly.
FIG. 4 is a view in elevation of one of the chocks utilized in this torsional damper device, shown in isolation.
FIGS. 6 and 7 are views analogous to those of FIGS. 4 and 5 of another form of chock utilized in the torsional damper device in accordance with the invention.

In the rest configuration of the assembly, springs 32 and 32' bear directly in the circumferential direction and at their corresponding ends on the radial edges of holes 34, 34' of guide rings 12 in which they are disposed, each elastic material block 32" bearing circumferentially on the radial edges of holes 34" in guide rings 12 through the intermediary of a chock 36T for those of these radial edges which are on the trailing side in the more usual direction of rotation of the assembly, indicated by an arrow F in FIG. 1, and corresponding to forward movement of the automotive vehicle concerned, and by a chock 36R for those of these edges which are on the leading side in the aforementioned direction of rotation.

In accordance with the invention, opposite hub flange 11 at least one of chocks 36T, 36R, and in practice both of the latter in the embodiment shown in FIGS. 1 to 9, has a recess 38 such that, on relative angular movement between coaxial parts A and B, and as will emerge hereinafter, hub flange 11 may become displaced in the circumferential direction beyond the point of contact of a chock 36T, 36R of this kind on the associated edge of holes 34" in guide rings 12.

In the embodiment shown in FIGS. 1 to 9, each chock 36T, 36R extends integrally from one of guide rings 12 to the other and is stirrup-shaped with lateral arms 39 bearing on the corresponding edge of holes 34" in guide rings 12 and with a median part 40 offering a bearing surface to the corresponding block 32" of elastic material.

Thus in this embodiment it is by virtue of its concavity that the stirrup member constituting a chock 36T, 36R forms the recess 38 which a chock of this kind has.

In the embodiment shown in FIGS. 1 to 9, each arm 39 of a stirrup member of this kind has a lug 42 which is formed, for example and as shown, by the radially innermost part of arm 39 appropriately cut out to this end. It is axially offset relative to the main part of the arm, and forms with this main part a yoke 43 by virtue of which said arm 39 is engaged on the corresponding edge of hole 34″ in the guide ring 12 concerned (FIGS. 3 to 7).

The yokes 43 which each chock 36T, 36R thus has constitute retaining means adapted to retain a chock 36T, 36R parallel to the axis of the assembly. If required, they may be elastically deformable in the axial direction and so grip in the direction of their thickness the corresponding guide rings 12.

In the embodiments shown, arms 42 of chocks 36T, 36R are disposed outside the volume delimited in the axial direction by guide rings 12 and their median part 40 within the latter.

It need hardly be said that the opposite arrangement is also possible.

In the embodiment shown, for reasons to be explained hereinafter, the circumferential amplitude L of a hole 33″ in hub flange 11 in which there is lodged a block 32″ of elastic material is equal to that of holes 34″ in guide rings 12 in which there is also lodged a block 32″ of elastic material. In the rest configuration of the assembly, the radial edges of these holes 33″ and 34″ are lined up with one another.

By virtue of the recess provided in accordance with the invention in each chock 36T, 36R there is, in the idle configuration of the assembly, circumferential clearance between the corresponding radial edge of each hole 33″ in hub flange 11 and median part 40 of chock 36T, 36R, of value JT in the case of chock 36T and JR in the case of chock 36R (FIGS. 1 and 3).

Each of these circumferential clearance JT, JR is proportional to the circumferential amplitude of recess 38 in the corresponding chock 36T, 36R.

In practice, they may be the same or different.

In the embodiment shown in FIGS. 1 to 9, the circumferential amplitude of recess 38 of chock 36T is less than that of recess 38 of chock 36R, so that circumferential clearance JT is less than circumferential clearance JR.

In practice, and as will emerge hereinafter, in the embodiment shown in FIGS. 1 to 9 circumferential clearance JR is sufficient for blocks 32″ of elastic material to have no effect in the corresponding circumferential direction.

Because of this, in this embodiment median part 40 of corresponding chock 36R is substantially at right angles to the edges of its arms 39.

On the other hand, median part 40 of chock 36T is slanting so that it is generally oblique relative to a radius of the assembly passing through its central area, in order to allow for relative angular movement between coaxial parts A and B.

Moreover, in the embodiment shown in FIGS. 1 to 9, median part 40 of each chock 36T, 36R has, in its central area, an opening 45 through which projects a peg 46 of elastic material integral with the block 32″ of elastic material concerned.

In this embodiment, the primary function of the pegs 46 thus provided on a block 32″ of elastic material of this kind is to maintain the block 32″ of elastic material parallel to the axis of the assembly.

As will emerge hereinafter, that associated with chock 36T has the further function of damping impact between the corresponding radial edge of hole 33″ in hub flange 11 and median part 40 of chock 36T on relative angular movement between coaxial parts A and B.

In operation with the direction of rotation as shown by the arrow F in FIG. 1 and the torque increasing, when torque is applied to coaxial part B, during a first phase of operation only elastically deformable arm(s) 28 of the first damper stage give elastically, doing so immediately.

In the diagram in FIG. 8, the abscissae represent the relative angular displacement D between the coaxial part B and the coaxial part A and the ordinates represent the torque C transmitted from one of these parts to the other. In this diagram, this first phase of operation is represented by a straight line I the slope of which is proportional to the stiffness of elastically deformable arm(s) 28.

This first phase of operation continues until, for a value D1 of relative angular displacement D, the corresponding radial edge of holes 33 in hub flange 11 in which are housed springs 32 of the second damper stage come into contact with the corresponding ends of springs 32.

The latter then come into play, their effect being combined with that of elastically deformable arm(s) 28. In the diagram in FIG. 8, this second phase of operation is represented by a straight line II the slope of which is proportional to the combined stiffness.

Similarly, for a value D2 of the relative angular displacement D, these springs 32′ in turn begin to act, at which time there begins a third phase of operation represented in the diagram in FIG. 8 by a straight line III the slope of which is proportional to the combined stiffness.

Finally, for a value D4 of the relative angular displacement D, the circumferential clearance JT associated with the blocks 32″ of elastic material is in turn absorbed (FIG. 9) such that, after a preliminary damping effect due to the crushing of their corresponding pegs 46, these blocks 32″ of elastic material in turn come into effect.

As a corollary to this, a circumferential clearance appears between the edge of the corresponding holes 34″ in guide rings 12 and the median part of yokes 43 formed by the corresponding chocks 36T, with the concomitant development of friction between said guide rings and said chocks. It will be understood that the lug 42 of the yokes of these chocks 36T has a length in the circumferential direction sufficient for the chocks to remain always engaged on guide rings 12.

The fourth phase of operation which begins with the entry into action of the blocks 32″ of elastic material is represented on the diagram in FIG. 8 by a straight line IV the slope of which is proportional to the combined stiffness of the elastic members acting at this time. It continues until, for a value D4 of the relative angular displacement D, coaxial part A is driven directly by coaxial part B, either because the turns of at least some of springs 32, 32′ are then contiguous or because the pegs 13 are then in contact with the corresponding edge of the notches 14 in the hub disk 11 through which they pass.

The torque then transmitted from coaxial part B to coaxial part A has a value C4 corresponding to the ordinate of the point on the straight line IV of which the abscissa is D4.

It is significantly greater than the torque C3 which would be transmitted in the absence of the blocks 32″ of elastic material, this being given by the ordinate of the point on the dashed extension of straight line III with the abscissa D4.

Thus by virtue of the blocks 32" of elastic material and the associated chocks 36T, 36R with recesses 38 the torgue rating of the torsional damper device in accordance with the invention is significantly increased as compared with what this would be in the absence of such blocks 32" of elastic material.

In practice, these blocks are disposed in the holes 33" in the hub flange 11 and the holes 34" in the guide rings 12 in which are usually disposed elastic members, in practice coil springs, forming the first damper stage. Thus, as mentioned hereinabove, these holes all have the same circumferential amplitude.

In order to obtain a torsional damper device in accordance with the invention having an increased torque rating it was necessary only, without altering the guide rings 12 or the hub flange 11, to form the first damper stage with the aid of elastically deformable arms 28 superposed axially on the coaxial parts A and B concerned, and to dispose in the holes 33" in the hub flange 11 and the holes 34" in the guide rings 12 thus made available blocks 32" of elastic material associated in accordance with the invention with chocks 36T, 36R with recesses 38.

This is favorable to the standardized manufacture of the guide rings 12 and the hub flange 11 for torsional damper devices having different torque ratings.

For operation of the assembly with decreasing torque, the torque between the coaxial parts B and A is reversed and a process similar to that previously described occurs.

However, in the embodiment shown in FIGS. 1 to 9, and allowing for the value selected to this end for circumferential clearance JR, the blocks 32" of elastic material do not have any effect so that only the first three phases of operation described hereinabove occur.

This is not necessarily the case, however, since the blocks 32" of elastic material could be effective with decreasing torque just as they are with increasing torque.

It will be understood that in foregoing description, and for reasons of simplification, no account has been taken of the well-known phenomenon of hysteresis which, due to friction between the coaxial parts A and B, results in a difference between the value of the torque transmitted between the coaxial parts A and B with increasing relative angular displacement and that of the torque transmitted between these coaxial parts with decreasing relative angular displacement.

In the embodiment shown in FIG. 10, each of the arms 39 of the stirrup member forming a chock 36T, 36R in accordance with the invention has a tang 48 which is offset in the axial direction relative to the main part of the arm 39, obliquely in the embodiment shown, and the edge of which bears directly on the corresponding edge of the hole 34" in the guide ring 12 concerned. Said main part of said arm 39 extends, at its free end, over said guide ring 12, directly in contact with the latter, outside the volume delimited in the axial direction by the guide rings 12, for the purpose of maintaining said stirrup member parallel to the axis of the assembly.

Also, in this embodiment as in that shown in FIGS. 11 to 15 and as will emerge hereinafter, each block 32" of elastic material is attached to at least one of the chocks 36T, 36R with which it is associated, more precisely to the median part 40 of the stirrup member constituting the chock.

For preference, and as shown, a block 32" of elastic material of this kind is thus attached to both of the chocks 36T and 36R with which it is associated.

Such attachment may be obtained by bonding or by vulcanizing the corresponding rubbery mass directly between chocks 36T and 36R in situ.

Be this as it may, each block 32" of elastic material and the associated chocks 36T and 36R then constitute a single assembly. This facilitates their handling and fitting.

Also, when an assembly of this kind is fitted, the block 32" of elastic material is thereby retained parallel to the axis of the assembly.

It is therefore unnecessary, in a case like this, to provide any projecting pegs on this block 32" of elastic material, as previously, unless such pegs are otherwise required for the damping effect which they can provide before the corresponding block 32" of elastic material comes into action.

In the embodiment shown in FIGS. 11 to 20, the stirrup member forming a chock 36T, 36R in accordance with the invention bears directly, through the edges of its arms 39, on the corresponding edge of the holes 34" in the guide rings 12 and there are associated with it retaining means adapted to maintain it parallel to the axis of the assembly.

For example (FIGS. 11 and 12), these retaining means may be formed by plates 49 attached to the arms 39 of a stirrup member of this kind, by adhesive bonding, for example, and either outside the volume delimited in the axial direction by the guide rings 12, for example for each of the latter (FIG. 11) or between at least one of the guide rings 12 and the hub flange 11 (FIG. 12).

In the embodiment shown in FIG. 13, the retaining means for the stirrup members constituting the chocks 36T, 36R are formed by at least one appropriately shaped extension 50 of the block 32" of elastic material concerned, this being attached to these stirrup members, as mentioned hereinabove.

In practice, in the embodiment shown, the block 32" of elastic material has two extensions 50 which extend in a generally radial direction from one of its axial surfaces, one in the direction towards the axis of the assembly and the other in the opposite direction, for insertion between the hub flange 11 and the corresponding guide ring 12.

Also, in this embodiment, each arm 39 of the stirrup member constituting a chock 36D, 36R is divided into at least two parts by a projection 52 which extends in a substantially circumferential direction, one of these parts being axially and obliquely offset relative to the other at its free end so as to adapt the assembly to the configuration of the hole 34" in the guide rings 12 concerned.

In the embodiment shown in FIGS. 14 and 15, the retaining means associated with the stirrup members constituting the chocks 36T, 36R are formed by appropriately shaped extensions 53 of the arms 39 of a stirrup member of this kind.

In practice, in the embodiment shown, an extension 53 of this kind extends generally radially in the direction towards the axis of the assembly, for insertion between each guide ring 12 and the hub flange 11, in contact with a guide ring 12 of this kind.

Moreover, in this embodiment, the median part 40 of the stirrup member constituting a chock 36T, 36R has, between its arms 39, a circular contour to match the volume, usually serving to house a spring, in which is disposed the assembly comprising, as described hereinabove, a block 32″ of elastic material and the associated chocks 36T, 36R.

Finally, in this embodiment, the arms 39 of a stirrup member of this kind comprise an extension 54 in the direction opposite to extension 53 and which is curved so as to follow the corresponding contour of the median part 40 of a stirrup member of this kind, so as to be matched thereto.

As shown by FIG. 15, the stirrup member thus constituting a chock 36T, 36R may be readily formed from an initially flat blank which is appropriately cut out and bent.

Figure 16:
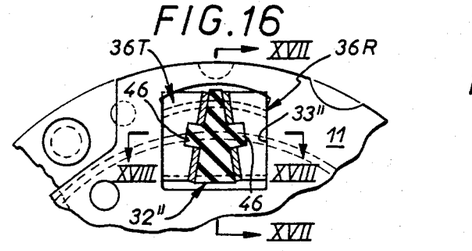
FIG. 16 is a partial cross-sectional view in elevation of another form of torsional damper device in accordance with the invention.
Figure 17:
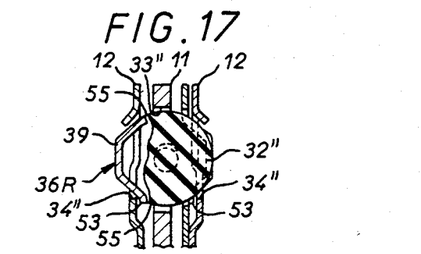
FIG. 17 is a partial view of it in axial cross-section on the line XVII—XVII in FIG. 16.
Figure 18:
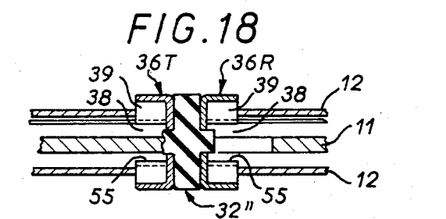
FIG. 18 is a partial view of it in circumferential cross-section on the line XVIII—XVIII in FIG. 16.

In the embodiment shown in FIGS. 16 to 18, the stirrup member constituting a chock 36T, 36R is formed by a cup member, of hexagonal cross-section in this embodiment, the edge 39 of which is at least partially cut away by notches 55 in two areas which are diametrically opposite one another, to form the recess 38 associated with it, with axial extensions 53 for retaining the assembly.

Figure 19:
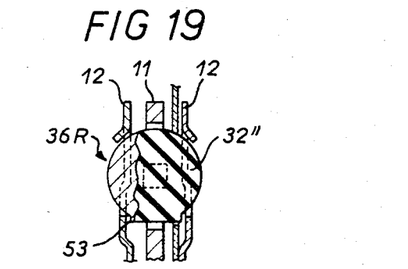
FIGS. 19 and 20 are views analogous to those of FIGS. 17 and 18, respectively, and relating to a yet further embodiment.
Figure 20:
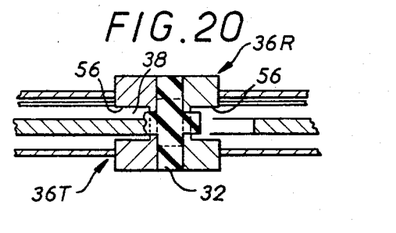

In the embodiment shown in FIGS. 19 and 20, the stirrup member is solid and of circular cross-section, being formed with a diametral groove 56 to form the recess 38 associated with it, with an axial extension 53 for retaining the assembly.

It will have been noted that in the previously described embodiments the elastic member, in the form of the block 32″ of elastic material, with which there is associated in accordance with the invention at least one chock 36T, 36R, forms part of the group of elastic members which is the last to come into effect in the torsional damper device concerned on relative angular movement between the two coaxial parts A and B which constitute the device.

This does not apply to the torsional damper device shown in FIGS. 21 to 30.

In this torsional damper device, and in a manner known per se, the holes 34, 34′ and 34″ in the guide rings 12 are blind holes, being formed by outward axial deformation of the guide rings 12 between two incisions which delimit each such deformation in the circumferential direction and conjointly, in practice, with axial deformation in the opposite direction of the guide rings between the holes thus constituted and alternating therewith.

By virtue of arrangements analogous to those described hereinabove springs 32, 32′ and 132″ are disposed in the housing formed by the holes 34, 34′ and 34″ in the guide rings 12 and by the holes 33, 33′ and 33″ in the hub flange 11.

In the embodiment shown there are therefore, alternating circular fashion, three springs 32, three springs 32′ and three springs 132″, each spring 132″ being disposed between a spring 32 and a spring 32′.

The springs 32, 32′ and 132″ used in this way may be identical to one another.

However, in an arrangement succinctly described hereinabove, the arrangement is such that, by an appropriate choice of the circumferential amplitudes of the holes concerned, on relative angular movement between the coaxial parts A and B of the torsional damper device concerned, the springs 32 first act alone, the springs 32′ then coming into effect, before the springs 132″ in turn contribute their effect to those of the previous springs.

In accordance with the invention, the springs 32, 32′ and 132″ do not bear directly in the circumferential direction on the edge of the corresponding holes 34, 34′ and 34″ in the guide rings 12 but, as previously, through the intermediary of chocks 36T, 36R each having a recess 38 so that, on relative angular movement between the coaxial parts A and B of the torsional damper device concerned, the hub flange 11 of the latter can become displaced circumferentially beyond the point of contact of a chock 36T, 36R of this kind on the corresponding edge of said holes 34, 34′ and 34″.

In practice, each of the chocks 36T, 36R thus utilized is, in the embodiment shown, divided into two separate chock members 60, one for each guide ring 12, these chock members being carried by respective guide rings 12 and axially separated from one another by an interval constituting the associated recess 38.

Figures 23, 24:
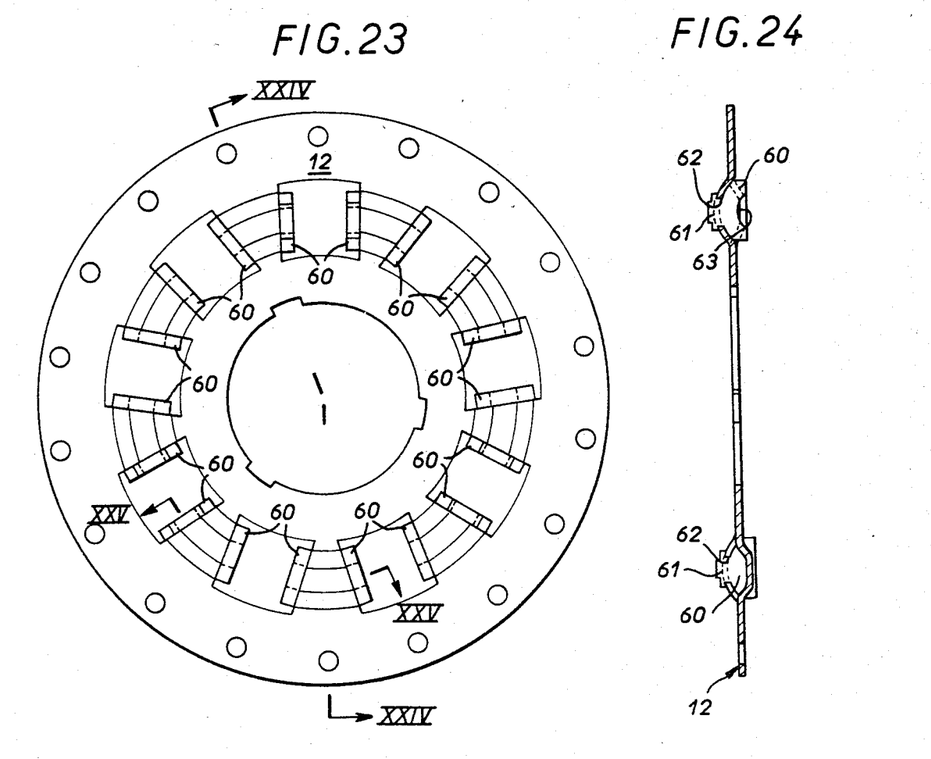
FIG. 23 is a plan view of one of the guide rings utilized in this torsional damper device, shown in isolation.
FIG. 24 is a view in axial cross-section of this guide ring on the line XXIV—XXIV in FIG. 23.
Figure 25:
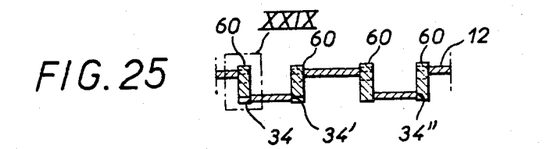
FIG. 25 is a view in circumferential cross-section, developed in the plane, of this guide ring on the line XXV—XXV in FIG. 23.
Figure 26:
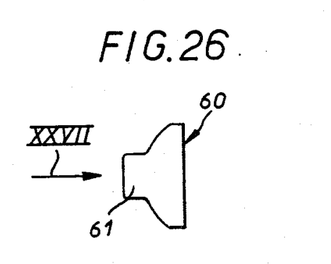
FIG. 26 is a view in elevation of one of the chock members fitted to this guide ring.
Figure 27:
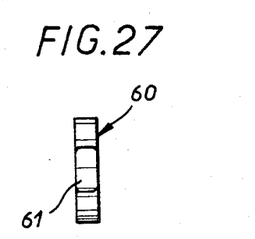
FIG. 27 is an end view in the direction of the arrow XXVII in FIG. 26 of this chock member.
Figure 28:
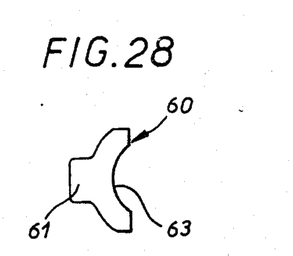
FIG. 28 is a view in elevation of another chock member fitted to the guide ring shown in FIGS. 23 and 24.
Figure 29:
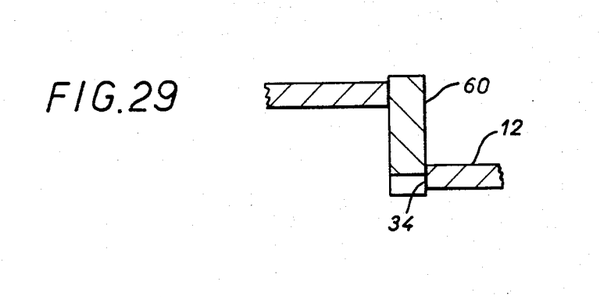
FIG. 29 shows to a larger scale that part of FIG. 25 indicated by the box XXIX thereon.

As can be seen in FIGS. 26 to 28 in particular, a chock member 60 of this kind has an axial peg 61 by means of which (FIG. 24) it is crimped to the corresponding guide ring 12, a guide ring 12 having to this end, to permit the passage of a peg 61 of this kind, a complementary opening 62 beyond which said peg 61 is deflected in the lateral direction (FIG. 24).

In practice, in the embodiment shown, each chock member 60 is cut out from a plate.

With regard to the springs 32′, 132″ (FIG. 26), the free edge of the chock member 60, that is to say the edge of the chock member 60 constituting part of the associated recess 38, is straight.

On the other hand, where the springs 32 are concerned (FIG. 28) the chock members 60 are each crescent-shaped, their free edge having, in its median part, a rounded notch 63 of large radius of curvature (FIG. 28).

Figure 21:
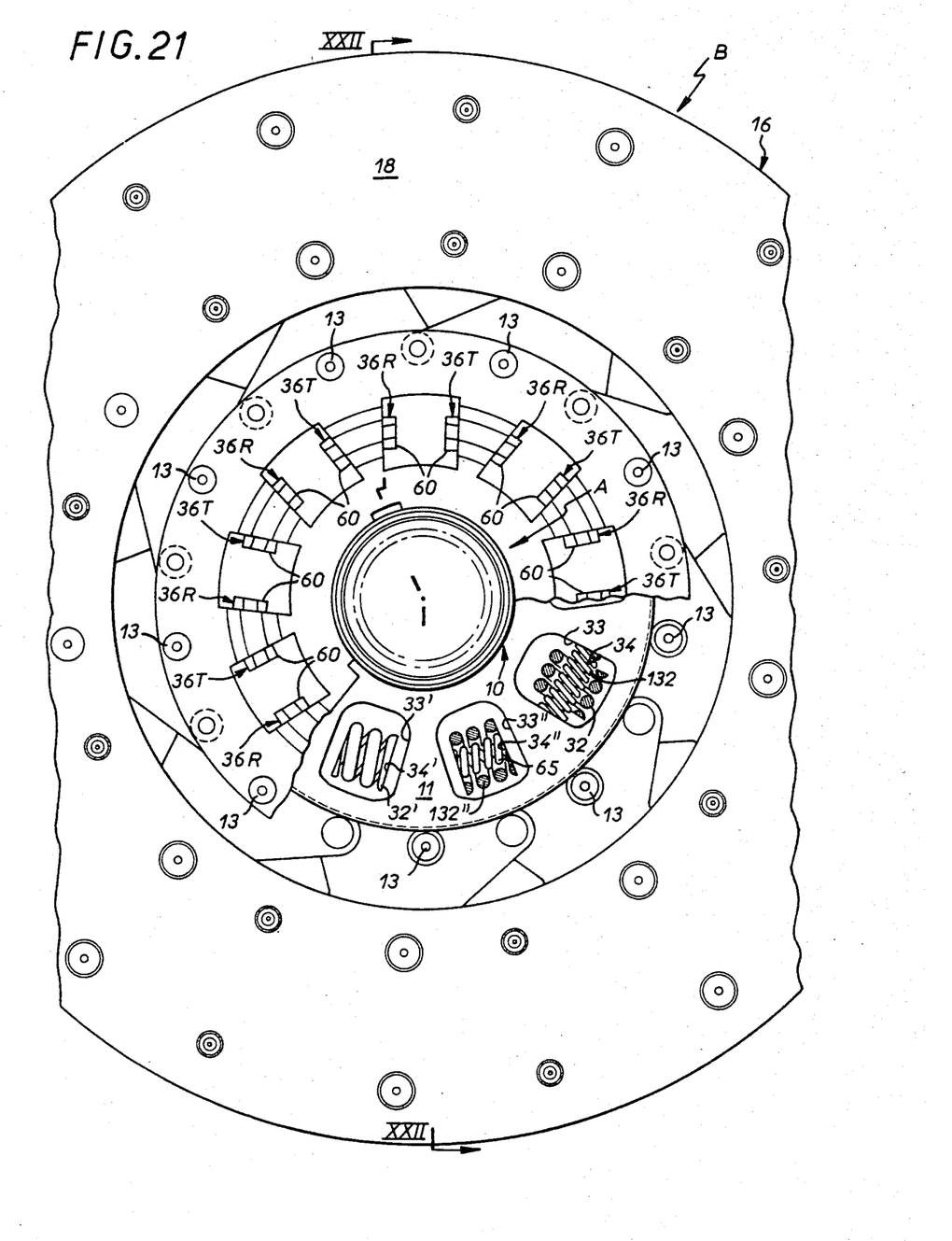
FIG. 21 is a partial and partially cut away view in elevation similar to that of FIG. 1 and relating to a further form of torsional damper device in accordance with the invention.
Figure 22:
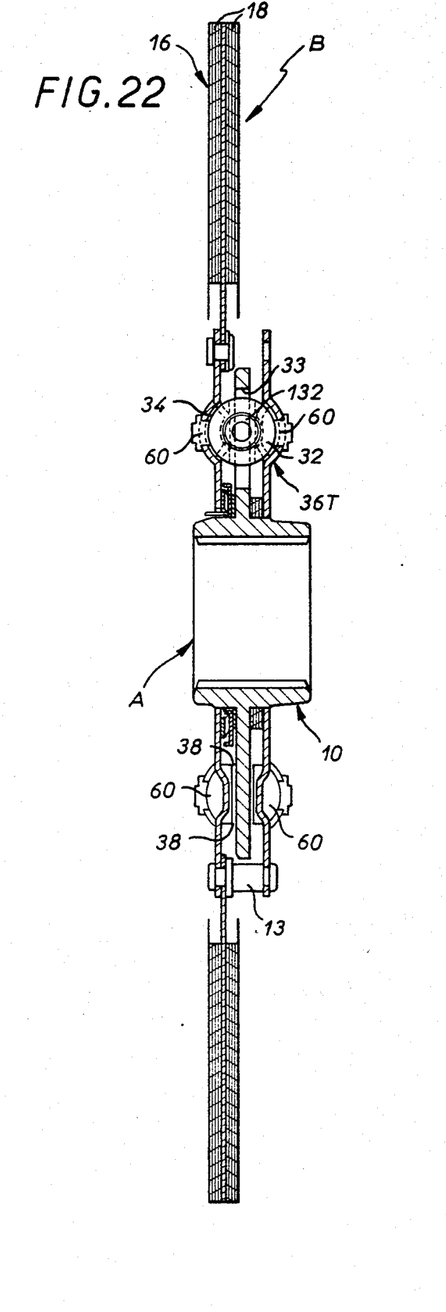
FIG. 22 is a view in axial cross-section of this torsional damper device on the line XXII—XXII in FIG. 21.

Chock members 60 of this kind allow an elastic member 132 to pass between them. Elastic member 132 is disposed coaxially within the corresponding spring 32 and projects beyond the spring at each end in the rest configuration of the assembly (FIG. 21).

In the embodiment shown, an elastic member 132 of this kind is constituted by a spring which at its ends bears directly on the edge of the hole 33 in the hub flange 11 and the holes 34 in the guide rings 12 in which it is disposed, its stiffness being in practice less than that of the spring 32 with which it is associated.

The three springs 132″ thus utilized constitute a first damper stage, of relatively lower stiffness, whereas the springs 32, 32′ and 132″ together constitute a second damper stage, of relatively higher stiffness.

As previously mentioned, these springs 32, 32′, 132″ are divided into three separate groups the intervention of which is modulated on relative angular movement between coaxial parts A and B.

Figure 30:
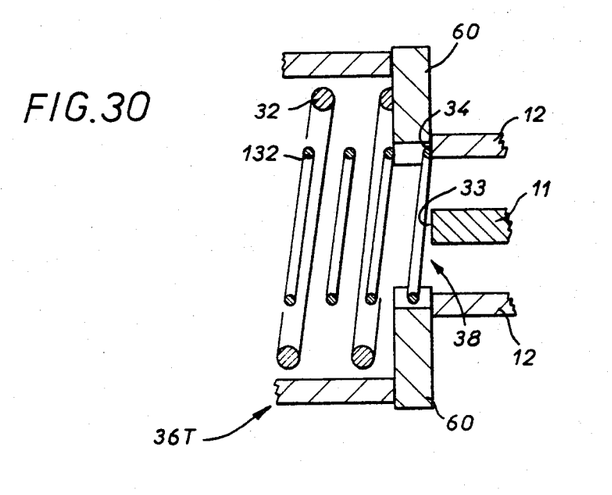
FIGS. 30 and 31 are views which, derived from that of FIG. 29, illustrate how certain of the chock members utilized in the torsional damper device shown in FIGS. 21 and 22 operate.
Figure 31:
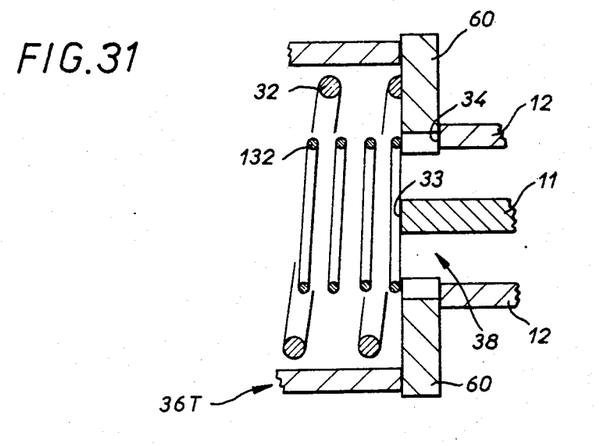

On such relative angular movement, and as shown by FIGS. 30 and 31, the springs 132″ are the first to act (FIG. 30), the hub flange 11 being able to engage to this end between the chock members 60 constituting the chocks 36T associated with the corresponding springs 32 and between the chock members 60 constituting the chocks 36T and also associated with the springs 32′ and 132″ in the embodiment shown.

The springs 32 then act (FIG. 11), followed by the springs 32′ and 132″.

In the embodiment shown, with each of the latter there is coaxially associated a spring 65 of the same length, to increase the overall stiffness (FIG. 21).

Thus, as will be readily understood, and as previously, the chocks 36T and 36R utilized in the torsional damper device described hereinabove offer the advantage of making it possible to use guide rings 12 previously formed for another type of torsional damper device by artifically shortening the circumferential amplitude of the holes which are formed in these guide rings 12 to house springs or other elastic members.

As an alternative to this, however, it is not necessary for chocks of this kind to be associated with all the springs utilized.

For example, the springs 32' and 132" and the spring 65 if any associated with the latter could bear directly in the circumferential direction on the edge of the corresponding holes 34' and 34" in the guide rings 12 in the rest configuration of the assembly.

In this case, only the chock members 60 with notches 63 are associated with the springs 32, to permit the passage of the elastic members 132 forming part of the group of elastic members which is the first to act on relative angular movement between coaxial parts A and B.

It will be understood that an elastic member 132 of this kind could be formed by a block of elastic material, instead of by a coil spring.

It will be understood that various changes in the details, materials and arrangements of parts, which have been herein described and illustrated in order to explain the nature of the invention, may be made by those skilled in the art within the principle and scope of the invention as expressed in the appended claims. For example, a single guide ring could be provided, in association with the hub flange.

Furthermore, in the case where, as described with reference to the embodiment shown in FIGS. 1 to 9, there is developed in operation friction between the guide rings and the yokes formed by the chocks in accordance with the invention, such friction could be adjusted to any required value, for example by providing yokes of this kind with an appropriate facing material, and/or differentiated from one of these yokes to the other, in particular to develop a friction torque having different values for the opposite directions of relative angular movement between the rotating parts in question.

The application of the invention is not limited to the case where the torsional damper device comprises only two coaxial parts disposed to rotate relative to one another, extending also to the case where a torsional damper device of this kind comprises a larger number of coaxial parts disposed to rotate in pairs.

What we claim is:

1. A torsional damper device comprising at least two coaxial parts disposed to rotate relative to one another within defined limits of relative angular movement, one of said parts having a transversely disposed flange and the other of said parts having a transversely disposed guide ring, circumferentially acting elastic means disposed between said parts for acting circumferentially on said parts so as to resist said relative angular movement between said parts, said elastic means including a plurality of individual elastic members, holes in said flange, holes in said guide ring, said holes in said flange and said guide ring together forming housings in which respective ones of said elastic members are disposed, a chock through which at least one of said elastic members bears on the edge of the respective hole in said guide ring, and a recess in said chock disposed in line with said flange, said recess defining means permitting angular movement of said flange relative to said guide ring in the circumferential direction beyond the point of contact of said chock with the edge of the corresponding hole in said guide ring.

2. A torsional damper device according to claim 1, wherein two of said guide rings are provided and attached to one another and disposed on opposite sides of said flange, said chock extending integrally from one of said guide rings to the other of said guide rings and being U-shaped, said chock having circumferentially extending arms adapted to bear on the corresponding edges of the corresponding holes in said guide rings and a median part forming a bearing surface for said one elastic member, said recess being formed by the concave side of said U-shaped chock.

3. A torsional damper device according to claim 2, wherein each of said arms of said U-shaped chock has a lug which is axially offset relative to the main part of said arm and which forms with said main part a yoke for receiving the edge of the corresponding hole in the corresponding guide ring.

4. A torsional damper device according to claim 2, wherein each of said arms of said U-shaped chock has a tang which is axially offset relative to a main part of said arm overlying said guide ring so as to maintain said U-shaped chock parallel to the axis of the torsional damping device.

5. A torsional damper device according to claim 2, wherein the edges of said arms of said U-shaped chock bear on the edges of the corresponding holes in said guide rings and further comprising retaining means adapted to maintain said U-shaped chock parallel to the axis of the torsional damping device.

6. A torsional damper device according to claim 5, wherein said retaining means comprise plates disposed on said arms of said U-shaped chock.

7. A torsional damper device according to claim 5, wherein said retaining means comprise appropriately shaped extensions of said arms of said U-shaped chock.

8. A torsional damper device according to claim 5, wherein said one elastic member associated with said chock comprises a block of elastic material and said retaining means comprises at least one appropriately shaped extension of said block of elastic material.

9. A torsional damper device according to claim 5, wherein each of said arms of said U-shaped chock is divided into at least two parts, one of which is offset relative to the other in the axial direction at its free end.

10. A torsional damper device according to claim 2, wherein said one elastic member associated with said chock comprises a block of plastic material and said median part of said U-shaped chock has a centrally disposed opening for receiving a peg of elastic material formed in one-piece with said block of elastic material.

11. A torsional damper device according to claim 2, wherein a said chock is provided at each circumferential end of said one elastic member associated with said chock and said median part of at least one of said chocks associated with said one elastic member is generally oblique relative to a radius of the torsional damping device passing through its central area.

12. A torsional damper device according to claim 2, wherein said one elastic member associated with said chock is a block of elastic material attached to said U-shaped chock.

13. A torsional damper device according to claim 2, wherein said elastic members forming said circumferentially acting elastic means are subdivided into a number of separate groups adapted to come into operation consecutively during relative angular movement between said coaxial parts depending on the relative angular position, and wherein said one elastic member associated with said chock forms part of said group of elastic members which comes into operation last.

14. A torsional damper device according to claim 1, wherein two said guide rings are provided attached to each other and disposed on opposite sides of said flange, said chock being divided into two separate chock members carried by the respective guide rings and axially spaced from each other to form said recess.

15. A torsional damper device according to claim 14, wherein said one elastic member associated with said chock is a coil spring and said chock members being crescent-shaped to permit the passage between said chock members of a further elastic member which, disposed coaxially within said coil spring, projects circumferentially beyond said coil spring in the rest configuration of the torsional damper device.

16. A torsional damper device according claim 15, wherein said further elastic member associated with said coil spring is less stiff than said coil spring.

17. A torsional damper device according to claim 16, wherein said elastic members forming said circumferentially acting elastic means are divided into a number of separate groups operative consecutively during said relative angular movement between said coaxial parts depending on the relative angular position, and wherein said further elastic member associated with said coil spring forms part of the group of elastic members which comes into operation first.

18. A torsional damper device according to claim 1, wherein there are a plurality of said chocks with said chocks being arranged in pairs and there being one of said chocks provided at each of the circumferential ends of each of said elastic members, and each of said chocks associated with the same elastic member having a recess in line with said flange.

19. A torsional damper device according to claim 18, wherein the circumferential dimension of said recess in one of said chocks of each pair of chocks is different to that of said recess in the other of said chocks of the same pair.

20. A torsional damper device comprising at least two coaxial parts disposed to rotate relative to each other within defined limits of relative angular movement, one of said parts including a transversely disposed flange and the other of said parts including at least one transversely disposed guide ring, a plurality of holes in said flange, a corresponding plurality of holes in said guide ring generally aligned with said plurality of holes in said flange, said holes forming housings for receiving circumferentially acting elastic members for resisting relative angular movement between said parts, a chock mounted in and bearing on the edge of at least one of said holes in said guide ring and accommodating a different elastic member, said chock having a recess axially in line with said flange, said recess defining means permitting movement of said flange relative to said guide ring in the circumferential direction beyond a point of contact of said chock with the associated edge of the corresponding hole in said guide ring whereby said chock and said different elastic member modify the torsion damping characteristics of said torsional damper device.

21. A torsional damper device according to claim 20, wherein two of said guide rings are provided and attached to one another and disposed on opposite sides of said flange, said chock extending integrally from one of said guide rings to the other of said guide rings and being U-shaped, said chock having circumferentially extending arms adapted to bear on the corresponding edges of the corresponding holes in said guide rings and a median part forming a bearing surface for said different elastic member, said recess being formed by the concave side of said U-shaped chock.

22. A torsional damper device according to claim 20, wherein said elastic members forming said circumferentially acting elastic means are subdivided into a number of separate groups with said groups being adapted to come into operation consecutively during relative angular movement between said coaxial parts depending on the relative angular position of said parts, and wherein said different elastic member associated with said chock forms part of that group of said groups of elastic members which comes into operation last.

23. A torsional damper device according to claim 20, wherein two said guide rings are provided, said guide rings being attached to each other and disposed on opposite sides of said flange, said chock being divided into two separate chock members each carried by a respective one of said guide rings and axially spaced from each other and forming said recess defining means.

* * * * *